(12) United States Patent
Tokushima

(10) Patent No.: US 8,600,204 B2
(45) Date of Patent: Dec. 3, 2013

(54) OPTICAL CONTROL DEVICE

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 13/443,385

(22) Filed: Apr. 10, 2012

(65) Prior Publication Data

US 2012/0195565 A1  Aug. 2, 2012

Related U.S. Application Data

(62) Division of application No. 12/522,809, filed as application No. PCT/JP2008/050192 on Jan. 10, 2008, now Pat. No. 8,208,776.

(30) Foreign Application Priority Data

Jan. 10, 2007  (JP) .................................. 2007-002634

(51) Int. Cl.
G02B 6/26   (2006.01)

(52) U.S. Cl.
USPC ........................................................... 385/50

(58) Field of Classification Search
None
See application file for complete search history.

(56) References Cited

U.S. PATENT DOCUMENTS

2004/0109644 A1*  6/2004  Assefa et al. .................... 385/39

* cited by examiner

*Primary Examiner* — Jerry Rahll

(57) ABSTRACT

Disclosed is an optical delay element that makes use of a line-defect waveguide of a photonic crystal, in which long optical delay time and small group speed dispersion are rendered compatible with each other and in which waveform distortion that might otherwise be produced in processing an ultra-high speed signal is eliminated. Two line-defect waveguides 5 and 11, having different pillar diameters and group velocity dispersions of opposite signs, are interconnected by a line-defect waveguide 8, the pillar diameters of which are gradually varied from one 5 of the line-defect waveguides to the other line-defect waveguide 11, such as to compensate for group speed dispersion as well as to maintain an optical delay effect.

6 Claims, 11 Drawing Sheets

OPTICAL CONTROL DEVICE

REFERENCE TO RELATED APPLICATION

This is a divisional application of U.S. patent application Ser. No. 12/522,809 filed Jul. 10, 2009 and claims the benefit of its priority.

TECHNICAL FIELD

This invention relates to an optical control device and, more particularly, to an optical control device usable for an optical delay element for use in an optical integrated circuit.

BACKGROUND ART

Recently, attention is directed to application of a photonic crystal to an optical integrated circuit. For example, a device for changing a spot size of light guided by a light waveguide is disclosed in Patent Document 1, while an optical control device that has a dispersion controlling effect is disclosed in Patent Document 2.
 Patent Document 1: JP Patent Kokai JP-A-2003-240985
 Patent Document 2: JP Patent Kokai JP-A-2005-274844

The disclosures of the Patent Documents 1 and 2 are to be incorporated herein by reference thereto. The following is an analysis on the related art according to the present invention. Nowadays, there is raised a demand for a technique for implementing an integrated circuit of optical components, such as a transistor integrated circuit. In the current state of the art, an optical fiber, as a waveguide, and a variety of optical components, such as a light switch, a wavelength filter or a 3 dB coupler, as individual optical components, are interconnected to form an optical circuit. If these optical components could be integrated on a small chip, it would be possible to reduce the circuit volume, power consumption and the manufacturing cost significantly.

A large variety of techniques for implementing optical integrated circuits have so far been developed. In particular, photonic crystals are stirring up notice as being a technique having a potential capability of reducing the size and the power consumption per unit performance of an optical device fabricated on a substrate to one hundredth or even to one ten-thousandth.

In a broad sense of the term, a photonic crystal is a generic name of structures the refractive index of which is caused to vary periodically. Although photonic crystals are used in general for an electromagnetic wave, they are so named because they were inherently devised for optical use and also because they were endowed with a periodic structure like that of a crystal.

The photonic crystals exhibit a wide variety of optical features, based on the periodicity of their refractive index. Their most representative feature is the photonic band gap (PBG). As periodic changes in the refractive index of a photonic crystal are increased, the light of a particular frequency band (or a wavelength band) ceases to be able to be propagated through the photonic crystal. If the light frequency and the wave number (, or the amplitude of wave vector in a certain direction) of light are assigned to the ordinate and abscissa axes, respectively, and the relationship between the frequency and the wave number of light propagated through the photonic crystal is plotted, we obtain a diagram termed a dispersion relationship diagram or a photonic band diagram. In this photonic band diagram, the frequency range in which plots are present in succession and distributed as a curve is termed a band. The light that cannot be propagated through the photonic crystal has a frequency that is located intermediate between neighboring bands, that is, in a gap between the neighboring bands. The forbidden band, through which light cannot be propagated, is termed a photonic band gap (PBG).

If there is a defect in the photonic crystal that might disturb periodicity of the refractive index distribution of the photonic crystal, the light at a frequency falling within the PBG is confined in the vicinity of the defect. In this case, only the light at a particular frequency corresponding to the size of the defect can be confined, with the photonic crystal functioning as an optical resonator. Hence, the photonic crystal may be used as a frequency filter or a wavelength filter.

If miniscule defects are arrayed within the photonic crystal in succession in a row to form a line defect, even the light having the frequency within the PBG can be propagated along the defect, while the light is confined in the vicinity of the line defect. It may thus be seen that the line defect of the photonic crystal plays the role of a waveguide. This waveguide may be called a line-defect waveguide.

If a filter and a waveguide can be implemented, a light modulator or a light switch may be constructed by solely the waveguide or by the waveguide and the filter in combination.

It is thus possible to arrange principal optical functional components in a photonic crystal and to interconnect the components to construct an optical circuit. Hence, the photonic crystal is expected to be used as a platform for the optical integrated circuit.

From the perspective of manufacture, a photonic crystal desirably has a two-dimensional periodicity. If it is attempted to utilize the effect of the PBG, such as light confining effect, the photonic crystal must have three-dimensional periodicity in three perpendicular directions of x, y and z. However, fabrication process for a three-dimensional periodic structure is complex and hence is expensive in manufacture. For this reason, a two-dimensional photonic crystal, having a two-dimensional periodicity in a substrate surface and having a finite size along the direction perpendicular to the substrate surface, that is, along the direction of substrate thickness, is often used. In such case, light confinement along its thickness in a line-defect waveguide or in a point defect resonator is secured not by , the PGG effect, but rather by total internal reflection caused by difference in the refractive index.

Strictly speaking, the optical characteristic of the two-dimensional photonic crystal having a finite thickness is not perfectly coincident with that of a two-dimensional photonic crystal having an infinite thickness, that is, a crystal that is uniform along its thickness. However, if the refractive index distribution along the direction of thickness of the two-dimensional photonic crystal having a finite thickness exhibits mirror symmetry (,or reflection symmetry) within a structural region where light is propagated, the optical characteristic of the two-dimensional photonic crystal having the finite thickness is roughly coincident with that of the two-dimensional photonic crystal having an infinite thickness. Prediction of the operation of a device of a photonic crystal with infinite thickness, that is, a device of the two-dimensional photonic crystal uniform along its thickness, is easier than that for which a finite thickness is taken into account. Hence, device implementation may be facilitated by exploiting the two-dimensional photonic crystal having refractive index distribution with the mirror symmetry.

Among a number of examples of a concrete structure of the two-dimensional photonic crystal having a finite thickness, thus far implemented, there are a hole-type photonic crystal and a pillar-type photonic crystal. In particular, a line-defect waveguide in the latter type crystal, that is, the pillar-type photonic crystal, is superior inter alia in the wave guiding characteristic.

FIG. 1 depicts a perspective view of a typical structure of a pillar-type photonic crystal with a finite thickness. Referring to FIG. 1, a multiplicity of pillars 2 with a finite height, made of a dielectric material, is arrayed in a square lattice pattern in a background medium 1. The dielectric material of the pillars has a dielectric constant higher than that of the background medium. By the way, the hole-type photonic crystal has a structure such as, in the structure shown in FIG. 1, the background medium 1 is made of a high dielectric constant material and the pillars 2 (columnar-shaped structures) are made of a low dielectric constant material. In a columnar-type square-lattice photonic crystal with a finite thickness, a line-defect waveguide can be formed by providing a row of dielectric pillars 3 as a line defect, a diameter of the pillars in the row, for example, being smaller than that of the pillars that make up otherwise perfect original crystal. In this case, the row of the columns of the line defect, is equivalent to a core in a waveguide that confines light by total internal reflection, such as an optical fiber, while the lattice(s) formed by pillars, disposed on each side of the row of pillars of the line defect, is (are) equivalent to a cladding.

In general, dielectric pillars in a photonic crystal are not limited to (circular) columns, and can be in any shape. It should be noted that a given dielectric pillar being 'thicker' or 'thinner' than other pillars means that the pillar in question is respectively larger or smaller in cross-sectional area than the others. In the present specification, the 'dielectric pillar' is defined as a pillar that has a dielectric constant, and encompasses air or vacuum, too.

The line-defect waveguide features a small group velocity and hence may be used as an optical delay element. In addition, the group velocity being small increases time of interaction between the guided light and the crystal material, as a result of which the effect of the interaction can be enhanced to a sufficient degree even if the waveguide is short. In other words, the effect of interaction per unit length is increased. Thus, with the line-defect waveguide, non-linear effects can efficiently be derived.

As for the line-defect waveguide of the pillar-type square-lattice photonic crystal, the group velocity of the guided light can be as small as one-twentieth to one-hundredth the speed of light in vacuum, as an example. Thus, even a short waveguide, can provide long delay time and hence a strong interaction with the material.

However, with this kind of waveguide that gives small group velocity of light, it is often experienced that the group velocity of the guided light is varied according to the light wavelength. Such wavelength-dependent variation in the group velocity is termed the 'group velocity dispersion'. The line-defect waveguide of the columnar square-lattice photonic crystal does exhibit the group velocity dispersion. Thus, if line-defect waveguide of the columnar square-lattice photonic crystal guides an optical signal spanning a non-negligible range of wavelength, such as ultra-high speed optical signal, a problem may be that the signal waveform becomes collapsed (or deformed) after passing through the waveguide.

Patent Document 2 discloses an optical control device that compensates for the group velocity dispersion. However, the optical control device disclosed therein is provided with a structure formed by directly interconnecting a plurality of photonic crystals having different values of group velocity dispersion, raising a problem that a loss due to reflection at a connection interface may be produced.

It is therefore an object of the present invention to provide an optical delay element making use of a line-defect waveguide of a square-lattice photonic crystal in which, by reducing the effect of the group velocity dispersion, long delay time and the low group velocity dispersion are rendered compatible to each other to allow for coping with an ultra high speed signal. The square-lattice photonic crystal may also be a photonic crystal of an arbitrary two-dimensional Bravais lattice.

It is another object of the present invention to reduce the size of the optical delay element to improve the integration degree of the optical integrated circuit.

It is a further object of the present invention to reduce the effect of reflection in compensating for the group velocity dispersion.

In a first aspect of the present invention, there is provided an optical control device including a plurality of line-defect waveguides provided in a photonic crystal, in which each line-defect waveguide includes a multiplicity of dielectric pillars with a finite height arranged at lattice points of a two-dimensional Bravais lattice. The optical control device comprises: a first line-defect waveguide; a second line-defect waveguide provided with the dielectric pillars having a thickness (cross-sectional area) different from that of the dielectric pillars of the first line-defect waveguide; and a third line-defect waveguide. The third line-defect waveguide is arranged between the first and second line-defect waveguides and provided with the dielectric pillars whose cross sectional areas are gradually varied from those of the dielectric pillars of the first line-defect waveguide to those of the dielectric pillars of the second line-defect waveguide along a wave guiding direction.

In a second aspect of the present invention, there is provided an optical control device including a plurality of line-defect waveguides provided in a photonic crystal, in which each line-defect waveguide includes a multiplicity of dielectric pillars with a finite height arranged at lattice points of a two-dimensional Bravais lattice. The optical control device comprises: a first line-defect waveguide; a second line-defect waveguide provided with dielectric pillars having cross-sectional shapes different from those of the dielectric pillars of the first line-defect waveguide; and a third line-defect waveguide. The third line-defect waveguide is arranged between the first and second line-defect waveguides and provided with the dielectric pillars whose cross-sectional shapes are gradually varied from those of the dielectric pillars of the first line-defect waveguide to those of the dielectric pillars of the second line-defect waveguide in the course from the first line-defect waveguide towards the second line-defect waveguide along the wave guiding direction.

In a third aspect of the present invention, there is provided an optical control device including a plurality of line-defect waveguides provided in a photonic crystal, in which each line-defect waveguide including a multiplicity of dielectric pillars with a finite height arranged at lattice points of a two-dimensional Bravais lattice. The optical control device comprises: a first line-defect waveguide; a second line-defect waveguide provided with the dielectric pillars that have lattice-point intervals (that is, local lattice constants) different from those of the dielectric pillars of the first line-defect waveguide; and a third line-defect waveguide. The third line-defect waveguide is arranged between the first and second line-defect waveguides and provided with dielectric pillars whose lattice-point intervals are gradually varied from those of the dielectric pillars of the first line-defect waveguide to those of the dielectric pillars of the second line-defect waveguide in the course from the first line-defect waveguide towards the second line-defect waveguide, along the wave guiding direction.

In a first formulation of the optical control device according to the first aspect, a further line-defect waveguide, whose dielectric pillars have cross-sectional areas gradually varied along the wave guiding direction, is provided at one end or at each of both ends along the wave guiding direction of the optical control device including the first to third line-defect waveguides.

In a second formulation of the optical control device according to the first aspect, the length along the wave guiding direction of the third line-defect waveguide is not less than five times a lattice pitch (lattice constant).

In a third formulation of the optical control device according to the first aspect, the dielectric pillars contained in the line defect of the first line-defect waveguide and the dielectric pillars not contained in the line defect are thicker (larger in cross section) than the that of the dielectric pillars contained in a line defect of the second line-defect waveguide and dielectric pillars not contained in the line defect. Or, the dielectric pillars contained in the line defect of the second line-defect waveguide and the dielectric pillars not contained in the line defect are thicker than that of the dielectric pillars contained in a line defect of the first line-defect waveguide and dielectric pillars not contained in the line defect.

In a fourth aspect of the optical control device according to the first aspect, thicknesses(cross-sectional areas) of the dielectric pillars contained in the line defect of the first and second line-defect waveguides differ only with respect to those of the dielectric pillars contained in the line defect of the first and second line-defect waveguides, and the thicknesses (cross-sectional areas) of dielectric pillars not contained in the line defect(s) of the first and second line-defect waveguides are equal.

In a fifth formulation of the optical control device according to the first aspect, thicknesses (cross-sectional areas) of the dielectric pillars not contained in the line defect of the first and second line-defect waveguide differ only with respect to those of the dielectric pillars not contained in the line defect (s) of the first and second line-defect waveguides, and the thicknesses (cross-sectional areas) of the dielectric pillars contained in the line defect(s) of the first and second line-defect waveguides are equal.

In a sixth formulation of the optical control device according to the first aspect, the thicknesses (cross-sectional areas) of the dielectric pillars contained in the line defects of the first and second line-defect waveguides gradually change in opposite directions between the dielectric pillars not contained in the line defect of the first and second line-defect waveguides and the dielectric pillars contained in the line defect of the first and second line-defect waveguides.

In a seventh formulation of the optical control device according to the second aspect, a further line-defect waveguide, whose dielectric pillars have cross-sectional shapes gradually varied along the wave guiding direction, is provided at one end or at each of both ends along the wave guiding direction of the optical control device including the first to third line-defect waveguides.

In an eighth formulation of the optical control device according to the second aspect, the length along the wave guiding direction of the third line-defect waveguide is not less than five lattice periods.

In a ninth formulation of the optical control device according to the second aspect, the cross-sectional shapes of the dielectric pillars contained in the line defect of the first and second line-defect waveguides differ only with respect to those of the dielectric pillars contained in the line defect of the first and second line-defect waveguides, and the cross-sectional shapes of dielectric pillars not contained in the line defect of the first and second line-defect waveguides are equal.

In a tenth formulation of the optical control device according to the second aspect, the cross-sectional shapes of the dielectric pillars not contained in the line defect of the first and second line-defect waveguides differ only with respect to those of dielectric pillars not contained in the line defect of the first and second line-defect waveguides, and the cross-sectional shapes of the dielectric pillars contained in the line defects of the first and second line-defect waveguides are equal.

In an eleventh formulation of the optical control device according to the second aspect, the cross-sectional shapes of the dielectric pillars contained in the line defects in the first and second line-defect waveguides are equal to the cross-sectional shapes of the dielectric pillars not contained in the line defects in the first and second line-defect waveguides.

In a twelfth formulation of the optical control device according to the second aspect, in at least one of the first and second line-defect waveguides, the cross-sectional shapes of the dielectric pillars contained in the line defects are different from the cross-sectional shapes of dielectric pillars not contained in the line defects.

In a thirteenth formulation of the optical control device according to the third aspect, a further line-defect waveguide, whose lattice-point intervals are gradually varied along the wave guiding direction, is provided at one end or at each of both ends along the wave guiding direction of the optical control device including the first to third line-defect waveguides.

In a fourteenth formulation of the optical control device according to the third aspect, the length along the wave guiding direction of the third line-defect waveguide is not less than five times a lattice period (pitch).

In a fifteenth formulation of the optical control device according to the third aspect, the lattice-point intervals of the dielectric pillars contained in the line defect of the first and second line-defect waveguides differ only with respect to those of the dielectric pillars contained in the line defect of the first and second line-defect waveguides, and the lattice-point intervals of dielectric pillars not contained in the line defect of the first and second line-defect waveguides are equal.

In a sixteenth formulation of the optical control device according to the third aspect, only lattice-point intervals of the dielectric pillars not contained in the line defect of said first and second line-defect waveguides differ, and wherein the lattice point intervals of the dielectric pillars contained in the line defect(s) of said first and second line-defect waveguides are equal.

In a seventeenth formulation of the optical control device according to the third aspect, in the first and second line-defect waveguides, the lattice-point intervals of the dielectric pillars contained in the line defects are equal to the lattice-point intervals of the dielectric pillars not contained in the line defects.

In an eighteenth formulation of the optical control device according to the third aspect, in at least one of the first and second line waveguides, lattice-point intervals of the dielectric pillars contained in the line defect are different from lattice-point intervals of the dielectric pillars not contained in the line defects.

In a nineteenth formulation of the optical control device according to any of the first to third aspects, the dielectric pillars are formed of a material higher in dielectric constant than a background medium.

In a twentieth formulation of the optical control device according to any of the first to third aspects, the dielectric pillar(s) is(are) a hole(s) provided in a high-refractive-index material.

In a twenty-first formulation of the optical control device according to any one of the first to third aspects, the two-dimensional Bravais lattice is a square lattice.

With the optical control device of the present invention, group velocity dispersion can be compensated while delay is kept long for application as an optical delay element. Hence, the delay element of the present invention may be applied even for an ultra-high speed signal spanning non-negligible range of wavelength. It is observed that, since the adverse effect of the waveform distortion due to group velocity dispersion can be suppressed, the optical control device (optical delay element) can be extended in its length along the wave guiding direction to significantly protract the delay time.

Also, a wavelength range in which group velocity was smaller but, originally, group velocity dispersion had been too large can be made available, so that optical delay can be achieved with a device with a waveguide shorter than those in conventional devices. Hence, the optical delay element can be reduced in size.

Additionally, with the optical control device of the present invention, reflection of light may be suppressed by interconnecting two different material types differing in the group velocity dispersion through a line-defect waveguide provided with a gradually varying structure.

EXPLANATION OF SYMBOLS

Figure 1:
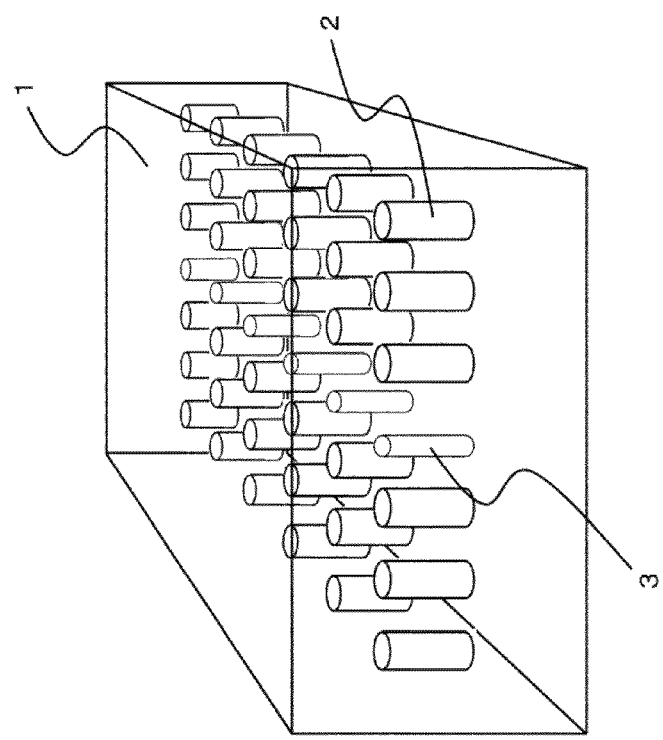
FIG. 1 is a perspective view showing a pillar-shaped photonic crystal having a finite thickness.

1 background medium (or high dielectric constant material)
2, 6, 9, 12, 15, 18, 21, 24, 27, 30, 33, 36, 39, 42, 45, 48, 51, 54, 57, 60, 63, 66, 69, 72, 75, 79, 82, 85 dielectric pillars (or void holes) not contained in line defects
3, 7, 10, 13, 16, 19, 22, 25, 28, 31, 34, 37, 40, 43, 46, 49, 52, 55, 58, 61, 64, 67, 70, 73, 76, 80, 83, 86, 88 dielectric pillars contained in line defects
5, 14, 23, 32, 41, 50, 59, 68, 78 first line-defect waveguide paths
11, 20, 29, 38, 47, 56, 65, 74, 84 second line-defect waveguide paths
8, 17, 26, 35, 44, 53, 62, 71, 81 third line-defect waveguide paths
89 basic translational vector a1 of one (hexagonal lattice) of two-dimensional Bravais lattice
90 basic translational vector a2 of one (hexagonal lattice) of two-dimensional Bravais lattice
91 basic translational vector of a line defect

PREFERRED MODES (Exemplary Embodiment 1)

An optical control device according to a first exemplary embodiment of the present invention is now described with reference to the drawings.

Figure 2:
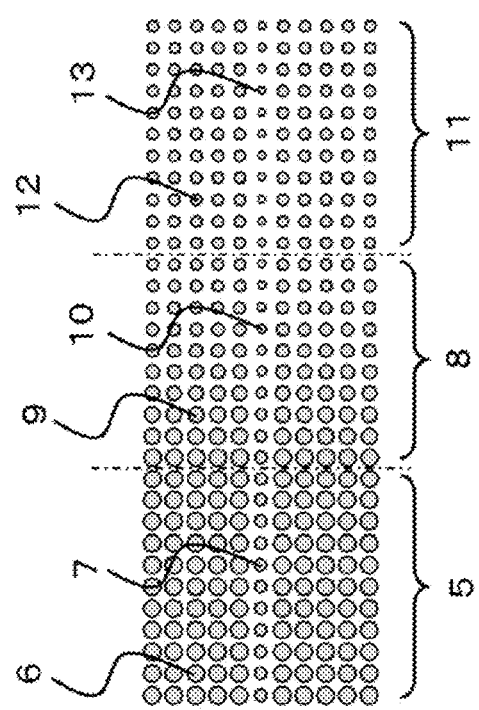
FIG. 2 is a cross-sectional view showing an optical control device according to a first exemplary embodiment.

Referring to FIG. 2, an optical control device according to a preferred first exemplary embodiment of the present invention, usable as an optical delay element, is comprised of a pillar-shaped square-lattice photonic crystal. This photonic crystal includes a multiplicity of pillars of a dielectric material of a finite height in which there is provided a line-defect waveguide. The optical control device includes a first line-defect waveguide 5, a second line-defect waveguide 11 and a third line-defect waveguide 8. The second line-defect waveguide 11, as a line-defect waveguide in a square-lattice photonic crystal, is provided with a multiplicity of pillars thinner than the dielectric pillars of the first line-defect waveguide. The third line-defect waveguide 8 is provided with dielectric pillars, the thickness (cross-sectional area) of which is gradually varied from the thickness of the pillars of the first line-defect waveguide to that of the pillars of the second line-defect waveguide along the wave guiding direction of the waveguides. The optical control device also includes a set of waveguides composed of the first line-defect waveguide 5, second line-defect waveguide 11 and the third line-defect waveguide 8, in which the thicknesses of the dielectric pillars are varied continuously (consecutively) in this sequence.

Preferably, the group velocity dispersion of the first line-defect waveguide 5 is opposite to that of the second line-defect waveguide 11. For example, the first line-defect waveguide 5 exhibits ordinary dispersion such that light with a shorter wavelength is guided at a speed lower than that of light with a longer wavelength. Conversely, the second line-defect waveguide 11 exhibits extraordinary dispersion such that light with a shorter wavelength is guided at a higher speed than that of light with a longer wavelength. Thus, on interconnecting the first line-defect waveguide 5 and the second line-defect waveguide 11, the two group velocity dispersions cancel each other on the whole.

However, the manner of spreading (distribution) of the electromagnetic field of light guided through the first line-defect waveguide 5 differs from that of light guided through the second line-defect waveguide 11. Thus, if the two waveguides are simply joined to each other, reflection or radiation of the guided light occurs at the joint.

The third line-defect waveguide 8 overcomes this problem. The third line-defect waveguide 8 undergoes gentle (or step-like) structural transitions between the first line-defect waveguide 5 and the second line-defect waveguide 11. Hence, the distribution of electromagnetic fields of the guided light also undergoes gentle (i.e., gradual) changes between the first line-defect waveguide 5 and the second line-defect waveguide 11, such that there scarcely occurs reflection or radiation of the guided light in the transition area.

If the optical control device is used as an optical delay element, the waveguides, connected at input and output ends of the optical control device, are connected to waveguides different from the waveguides that compose the optical control device in order to provide for high speed propagation of the light signal. It is preferred in such case to provide a line-defect waveguide, the pillar thicknesses of which are gradually varied, on one side or each side of the optical control device, in order to provide for continuous optical coupling of the optical control device to the high speed waveguides.

The third line-defect waveguide 8 has a function of achieving continuous optical coupling between the first line-defect waveguide 5 and the second line-defect waveguide 11. In order for this function to be in full play to suppress reflection or radiation in the third line-defect waveguide 8 to a negligible value, the third line-defect waveguide 8 is preferably not less than 5 periods (pitch) of the lattice in the wave guide direction.

Referring to FIG. 2, comparison of the thicknesses of the dielectric pillars of the first line-defect waveguide 5 to those of the dielectric pillars of the second line-defect waveguide 11 indicates that dielectric pillars 7 contained in the line-defect of the first line-defect waveguide 5 are thicker than dielectric pillars 13 contained in the line defect of the second line-defect waveguide, and that dielectric pillars 6 not contained in the line defect of the first line-defect waveguide are thicker than dielectric pillars 12 not contained in the line defect of the second line-defect waveguide. In such structure, the thickness ratio of the dielectric pillars 7 of the first line-defect waveguide 5 and the dielectric pillars 13 of the second line-defect waveguide 11 can be set so as to be equal or approximately equal to the thickness ratio of the dielectric pillars 6 not contained in the line defect of the first line-defect waveguide 5 and the dielectric pillars 12 not contained in the line defect of the second line-defect waveguide 11. This thickness ratio is correlated with the intensity of confinement of guided light to the vicinity of the line defect. Thus, with the optical control device, shown in FIG. 2, the spread of the guided light in the vicinity of the line defect may be kept to be substantially equal throughout the entire device. The structure of the optical control device, shown in FIG. 2, is therefore effective when it is desired to maintain the width of the line-defect waveguide to a certain value fixed according to manufacturing constraints.

Figure 3:
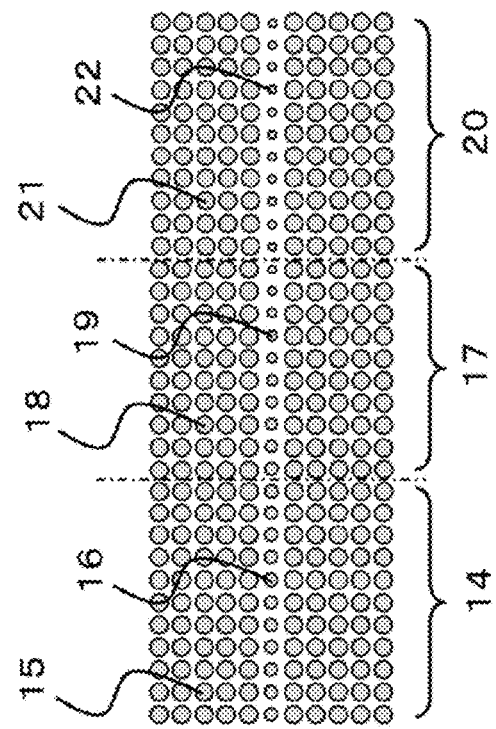
FIG. 3 is a cross-sectional view showing an optical control device according to the first exemplary embodiment.

As shown in FIG. 3, the thicknesses of the dielectric pillars of a first line-defect waveguide 14 may be equal to those of the dielectric pillars of a second line-defect waveguide 20 except the thicknesses of the dielectric pillars 16 and 22 of the respective line defects which are different. If only the thicknesses of the dielectric pillars 16, 22 of the respective line defects are varied, the advantages of protracting the delay time and canceling out the group velocity dispersion, both of which are the features as the optical delay elements, are approximately the same as in the case of changing not only the thicknesses of the dielectric pillars 16, 22 contained in the line defects from each other but also changing those of the dielectric pillars 15, 21 not contained in the line defects from each other. It is observed, however, that changing only the thicknesses of the dielectric pillars contained in the line defects give rise to a merit that implementation of the third line-defect waveguide 17 may be facilitated since it is then only necessary to change the thicknesses of the dielectric pillars 19 in the line-defect row.

Figure 4:
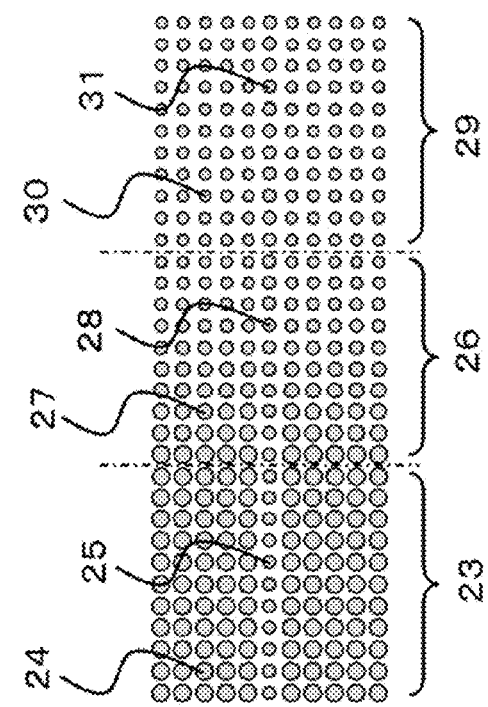
FIG. 4 is a cross-sectional view showing an optical control device according to the first exemplary embodiment.

As shown in FIG. 4, on the other hand, only the thicknesses of the dielectric pillars 24 not contained in the line defect of a first line-defect waveguide 23 may differ from those of the dielectric pillars 30 not contained in the line defect of a second line-defect waveguide 29. The optical control device of this construction has a merit that, since the thicknesses of the dielectric pillars 25, 28 or 31, contained in the line defects where the energy of the guided light is concentrated, are unchanged, a third line-defect waveguide 26 is relatively free from losses otherwise caused by reflection or radiation.

The above-described three structures pertinent to the thicknesses of the dielectric pillars, shown in FIGS. 2 to 4, may, of course, be present together in a mixed configuration in one structure.

Also, the dielectric pillars contained in the line defect of the first line-defect waveguide may be thicker in thickness than those contained in the line defect of the second line-defect waveguide, while the dielectric pillars not contained in the line defect of the first line-defect waveguide may be thinner in thickness than those in the line defect of the second line-defect waveguide.

(Exemplary Embodiment 2)

Figure 5:
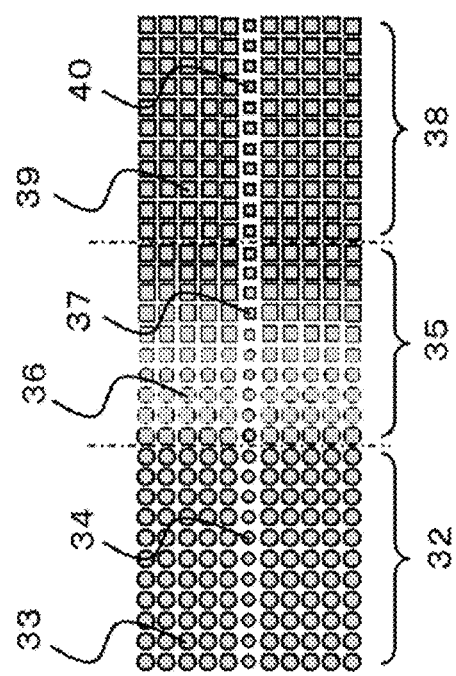
FIG. 5 is a cross-sectional view showing an optical control device according to a second exemplary embodiment.

In a second exemplary embodiment of the present invention, a light control element has a line-defect waveguide in a pillar-shaped square-lattice photonic crystal provided with a multiplicity of dielectric pillars that have a finite height, as shown in FIG. 5. The optical control device includes a first line-defect waveguide 32, a second line-defect waveguide 38 and a third line-defect waveguide 35. The second line-defect waveguide 38 is a line-defect waveguide in a square-lattice photonic crystal, which includes dielectric pillars 39, 40 differing in cross-sectional shape from dielectric pillars 33, 34 of the first line-defect waveguide 32. The third line-defect waveguide 35 includes dielectric pillars 36, 37. The cross-sectional shapes of the dielectric pillars 36 is(are) gradually varied from the cross-sectional shapes of the dielectric pillars 33 of the first line-defect waveguide 32 to those of the dielectric pillars 39 of the second line-defect waveguide 38 along the wave guiding direction of the waveguide. Similarly, the cross-sectional shapes of the dielectric pillars 37 are gradually varied from the cross-sectional shapes of the dielectric pillars 34 of the first line-defect waveguide 32 to those of the dielectric pillars 40 of the second line-defect waveguide 35 along the wave guiding direction of the waveguide. The optical control device includes a set of waveguides in which the first line-defect waveguide 32, the third line-defect waveguide 35 and second line-defect waveguide 38 are joined together in this order, the cross-sectional shapes of the dielectric pillars being changed continuously (consecutively).

The second exemplary embodiment corresponds to what is constructed by substituting changes in the cross-sectional shapes for changes in thicknesses of the dielectric pillars of the first exemplary embodiment. The first exemplary embodiment is suited for suppressing the group velocity dispersion of the optical control device, operating as an optical delay element, to substantially zero. However, the first exemplary embodiment leaves something to be desired in that group velocity dispersion may not be suppressed over a broad frequency range in its entirety. On the other hand, although the second exemplary embodiment is slightly inferior to the first exemplary embodiment in reducing the group velocity dispersion to approximately zero; however, with the second exemplary embodiment, the wavelength dependency of the group velocity dispersion of the entire optical control device can be finely (precisely) controlled over a wide frequency range by varying the cross-sectional shapes of the dielectric pillars. Hence, the structure of the optical control device of the second exemplary embodiment is effective in the case where it is desired to endow the light transmitted through the optical control device with specified group velocity dispersion.

For coupling to waveguides with different characteristics, the present optical control device may be provided on its one side or on each side with a line-defect waveguide having the dielectric pillars whose cross-sectional shapes are varied gradually (stepwise).

To sufficiently suppress internal reflection or radiation, the third line-defect waveguide is preferably not shorter than five times a period (pitch) along the wave guiding direction.

Figure 6:
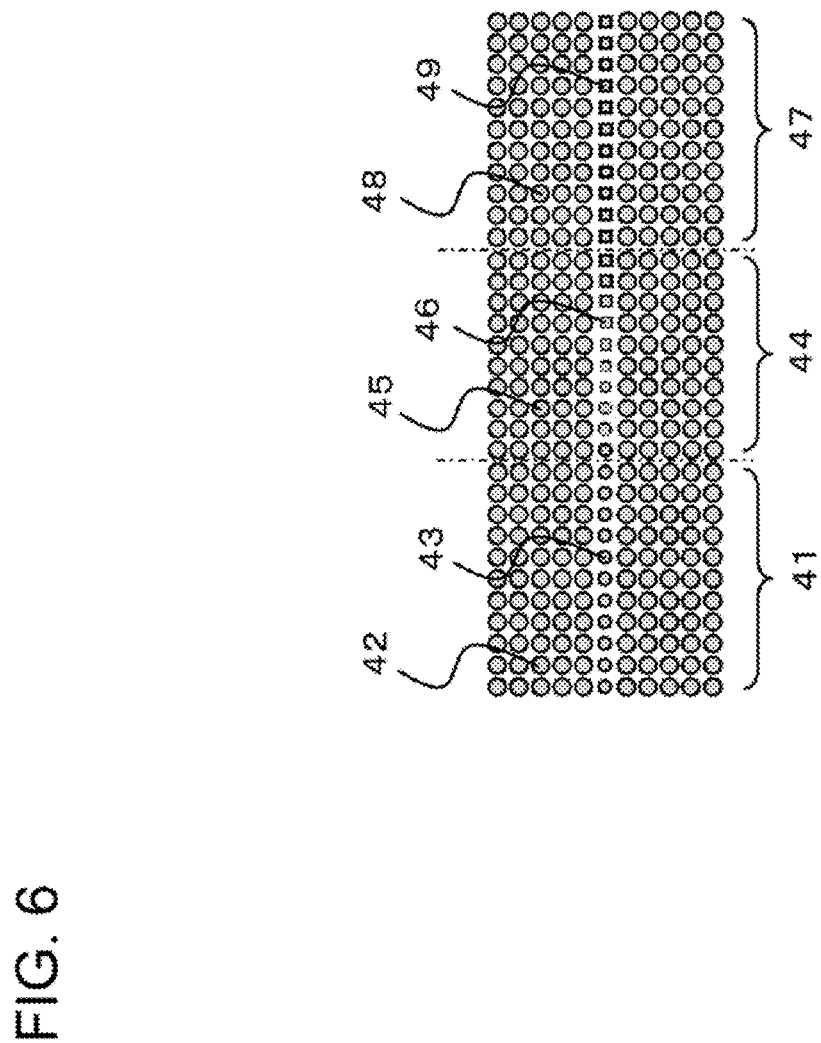
FIG. 6 is a cross-sectional view showing an optical control device according to the second exemplary embodiment.

As shown in FIG. 6, only the cross-sectional shapes of dielectric pillars 43 contained in a line defect of a first line-defect waveguide 41 may be different from those of dielectric pillars 49 contained in a line defect of a second line-defect waveguide 47. This structure has an advantage that implementation may be facilitated.

Figure 7:
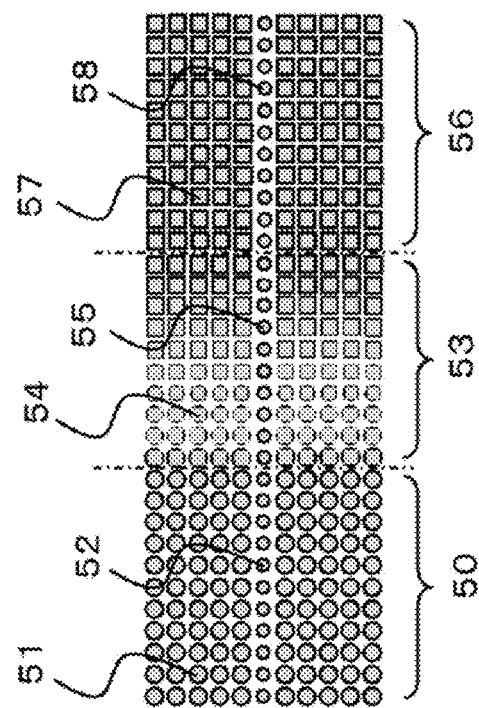
FIG. 7 is a cross-sectional view showing an optical control device according to the second exemplary embodiment.

As shown in FIG. 7, only the cross-sectional shapes of dielectric pillars 51 not contained in its line defect of a first line-defect waveguide 50 may be different from those of dielectric pillars 57 not contained in its line defect of a second line-defect waveguide 56. This structure has an advantage that reflection or radiation in a third line-defect waveguide 53 may be suppressed more effectively than with the structure shown in FIG. 5 or 6.

The basic structure of the first and second line-defect waveguides is a structure shown in FIG. 5, in which, in each of the first and second line-defect waveguides, the cross-sectional shapes of the dielectric pillars contained in the line defect(s) are the same as, those of the dielectric pillars not contained in the line defects.

However, if, with this basic structure (FIG. 5), the group velocity dispersion cannot be controlled with sufficient accuracy, the cross-sectional shapes of the dielectric pillars contained in the line defect may be different from those of the dielectric pillars not contained in the line defect in at least one of the first and second line-defect waveguides (FIGS. 6 and 7).

(Exemplary Embodiment 3)

Figure 8:
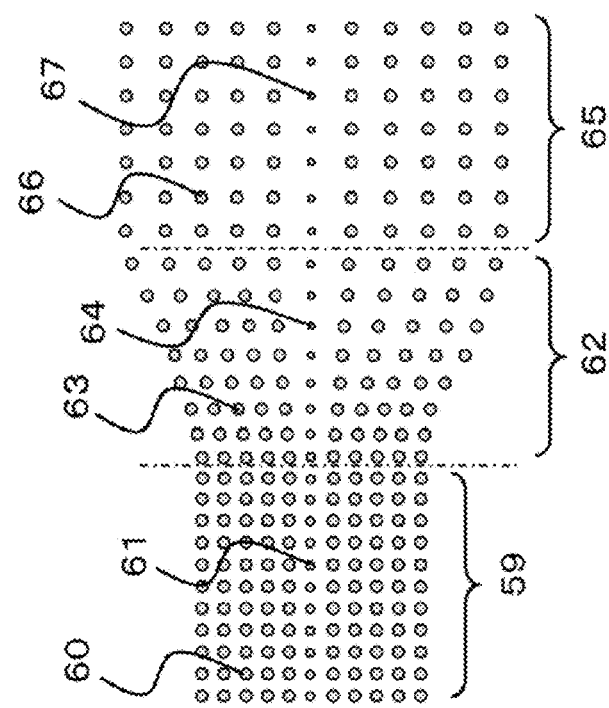
FIG. 8 is a cross-sectional view showing an optical control device according to a third exemplary embodiment.

A third exemplary embodiment of the present invention is directed to an optical control device, in particular an optical delay element which is comprised of a pillar-type square-lattice photonic crystal that has dielectric pillars with a finite height, and also has a line defect, as shown in FIG. 8. The optical control device includes a first line-defect waveguide 59, a second line-defect waveguide 65 and a third-line-defect waveguide 62. The second line-defect waveguide 65 is made up of dielectric pillars 66 and 67. The dielectric pillars 66 have lattice-point intervals, that is, local lattice constants, different from those of dielectric pillars 60 of the first line-defect waveguide 59, and the dielectric pillars 67 have lattice point intervals, that is, local lattice constants, different from those of dielectric pillars 61 of the first line-defect waveguide 59. The third line-defect waveguide 62 is interposed between the first line-defect waveguide 59 and the second line-defect waveguide 65, and is made up of dielectric pillars 63 and 64. The lattice point intervals of the dielectric pillars 63 are varied gradually from those of the first line-defect waveguide 59 to those of the second line-defect waveguide 65 in the course from the first line-defect waveguide 59 towards the second line-defect waveguide 65. In a similar manner, the lattice point intervals of dielectric pillars 64 are varied gradually from those of the first line-defect waveguide 59 to those of the second line-defect waveguide 65 in the course from the first line-defect waveguide 59 towards the second line-defect waveguide 65.

It should be noted that the 'lattice point interval' means a distance (interstice) between the centers of cross sections of a dielectric pillar of interest and a dielectric pillar adjacent thereto, while the 'local lattice constant' means a summation average of the all intervals between the centers of cross sections of a dielectric pillar of interest and the dielectric pillars adjacent thereto.

The present third exemplary embodiment corresponds to what is constructed by substituting variations in the lattice point intervals (local lattice constants) of dielectric pillars for variations in thicknesses (cross-sectional areas) of the dielectric pillars in the first exemplary embodiment. If the present third exemplary embodiment is used as an optical delay element, it is possible to realize substantially the same characteristic as that of the first exemplary embodiment with respect to controlling of the group velocity dispersion. The third exemplary embodiment may be said to differ from the first exemplary embodiment in that, since control of the positions of lattice points taken up by the dielectric pillars is easier than that of the thicknesses of the dielectric pillars, it is easier with the third exemplary embodiment to fabricate an optical control device conforming to design parameters.

With the present exemplary embodiment, a line-defect waveguide, the lattice point intervals of dielectric pillars of which are varied gradually along the wave guiding direction, may be provided on one or each side of the optical control device comprised of the first to third line-defect waveguides. It is thereby possible to provide for optical coupling of the optical control device to waveguides of different characteristics without producing reflections or radiations of the guided light.

With the present optical control device, the third line-defect waveguide 62 is preferably not shorter than five times a period along the wave guiding direction. It is thereby possible to suppress reflections or radiations in the third line-defect waveguide 8 to a substantially negligible value.

Figure 9:
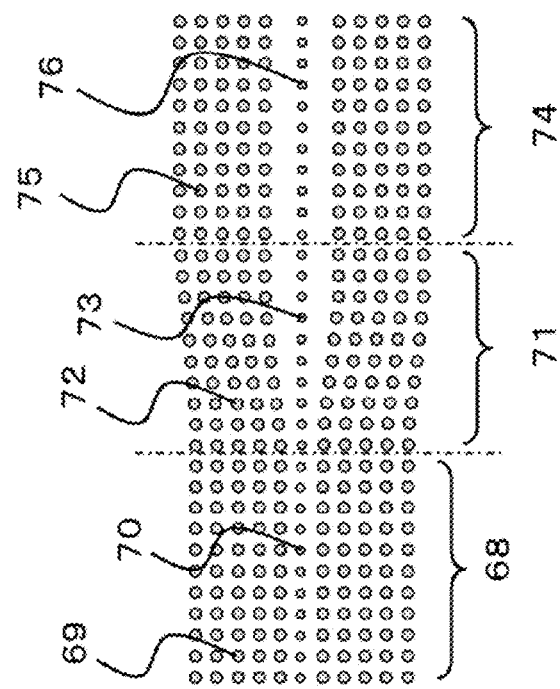
FIG. 9 is a cross-sectional view showing an optical control device according to the third exemplary embodiment.

As shown in FIG. 9, the present optical control device may be implemented by a structure in which only the lattice point intervals of the dielectric pillars 70 contained in a line defect of a first line-defect waveguide differ from those of the dielectric pillars 76 contained in a line defect of a second line-defect waveguide. The dielectric pillars 69 and 75, not contained in the line defects, has the same structure.

FIG. 9 shows a concrete example structure for this case. That is, with this example structure, the intervals of the dielectric pillars 70, 76, contained in the line defects, are constant, while those of the dielectric pillars 69, 75, not contained in the line defects, have the same value and constant. The lattices (points) of the dielectric pillars 69, not contained in the line defect of the first line-defect waveguide 68, are disposed close to both sides of the dielectric pillars 70 contained in the line defect of the first line-defect waveguide. The lattices (points) of the dielectric pillars 75, not contained in the line defect of the second line-defect waveguide 74, are disposed apart from both sides of the dielectric pillars 76 contained in the line defect of the second line-defect waveguide 74. In a third line-defect waveguide guide 71, the lattice points of the dielectric pillars 72, not contained in its line defect, are disposed gradually removed (more apart) from both sides of the dielectric pillars 73 contained in the line defect in a width-wise direction, that is, in a direction normal to the wave guiding direction and parallel to the plane of the two-dimensional lattice in the course of progressing from the first line-defect waveguide 68 towards the second line-defect waveguide 74. This means that only the lattice point intervals taken in the width-wise direction of line defect rows 70, 73, 76 are gradually widened along the wave guiding directions.

Figure 10:
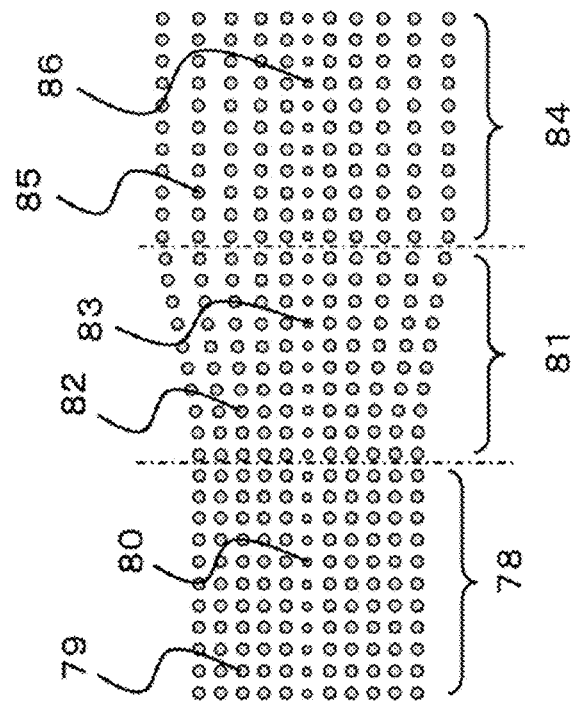
FIG. 10 is a cross-sectional view showing an optical control device according to the third exemplary embodiment.

Conversely, a structure may be assumed in which only the lattice point intervals of dielectric pillars 79, not contained in the line defect of the first line-defect waveguide, are different from those of dielectric pillars 85 not contained in the line defect of the second line-defect waveguide, while those of dielectric pillars 80, 86, contained in the line defects of the first and second line-defect waveguides, are equal to one another. A concrete example structure for this case is shown in FIG. 10. That is, the optical control device has such a structure in which the lattice point intervals between the dielectric pillars 80, 86 of the line defects and dielectric pillars disposed closest to the line defects are constant, and in which the other lattice point intervals between the dielectric pillars are gradually increased in the width-wise direction, in the course of progressing from the first line-defect waveguide 78 towards the second line-defect waveguide 84, that is, in the direction perpendicular to the wave guiding direction and parallel to the two-dimensional lattice plane. It is only the lattice point intervals in the width-wise direction of the dielectric pillars 79, 85 not contained in the line defect rows that are widened in this case.

A further different structure of an optical control device may be provided as such a one in which the lattice-point intervals between the dielectric pillars contained in the line defect are equal to those between the dielectric pillars not contained in the line defect for each of the first and second line-defect waveguides.

A further different structure of an optical control device may be provided as one in which, in at least one of the first line-defect waveguide and the second line-defect waveguide, the lattice point intervals between dielectric pillars contained in the line defect differ from those between the dielectric pillars not contained in the line defect.

In the above description of the first to third exemplary embodiments, the dielectric pillars are formed of a material higher in dielectric constant than the background medium. Alternatively, the dielectric pillars may be formed of a material lower in dielectric constant than the background medium. In an exemplary case, the dielectric pillars is(are) a hole(s) (void) provided in a high dielectric constant material.

The line-defect waveguide of the pillar-shaped square lattice photonic crystal in each of the first to third exemplary embodiments may be formed so as to have low group velocity and different effects of group velocity dispersion. This is made possible by properly adjusting the thicknesses and/or shapes of the dielectric pillars provided in the lattice or the lattice point intervals. In particular, if it has been possible to form two or more waveguides so that these waveguides will have reverse group velocity dispersion effects, and if these waveguides may be interconnected via a gently changing structure, it is possible to reduce overall group velocity dispersion without causing reflection between the interconnected waveguides as well as to obtain prolonged optical delay time.

In the above description of the first to third exemplary embodiments, the crystal system of the two-dimensional lattice of the photonic crystal is assumed to be a square lattice. This is of course not restrictive such that any of two-dimensional Bravais lattice structures may be used in place of the square lattice.

As for the line defect, the direction of the basic translational vector in the Bravais lattice structure is not restrictive such that the line defect may be a row of defects arrayed along any arbitrary one of translational vectors.

Figure 11:
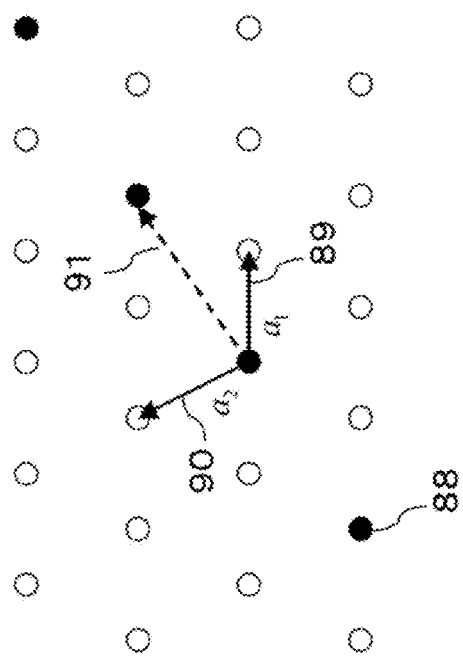
FIG. 11 is a schematic view for illustrating a structure of a line defect in a two-dimensional Bravais lattice.

FIG. 11 depicts a schematic view for illustrating the structure of a line defect in a two-dimensional Bravais lattice. In FIG. 11, there are shown lattice points of a hexagonal lattice and basic translational vectors a1 and a2 (89 and 90 of FIG. 11). In this case, it is sufficient that dielectric pillars 88, contained in a line defect, are arrayed in a row along any of the translational vectors. FIG. 11 shows a case where the basic translational vector of dielectric pillars, contained in the line defect, is given by 2a1+a2.

In the above description, the line defect is assumed to be arrayed in a single row for convenience of simplified explanation. It may, however, include multiple rows.

EXAMPLE 1

Example 1 of the present invention is now described with reference to the drawings.

FIG. 2 depicts a cross-sectional view of a high refractive index material of an optical control device (element), which has a line-defect waveguide provided in a columnar-type square-lattice photonic crystal. The cross-sectional view shows the material from a direction perpendicular to the lattice plane.

Referring to FIG. 2, the optical control device of Example 1 of the present invention (optical delay element) is an optical delay element comprised of a pillar-type square-lattice photonic crystal that has a multiplicity of dielectric (circular) columns with a finite height. The photonic crystal includes a line-defect waveguide. The optical control device 1 includes a first line-defect waveguide 5, a second line-defect waveguide 11 and a third line-defect waveguide 8. The second line-defect waveguide, a line-defect waveguide provided in the square-lattice photonic crystal, is provided with dielectric columns thinner than the dielectric columns of the first line-defect waveguide 5. The third line-defect waveguide 8 is a line-defect waveguide in which the thickness of the dielectric columns is varied gradually from that of the dielectric columns in the first line-defect waveguide to those of the dielectric pillars in the second line-defect waveguide along the wave guiding direction of the waveguide. The optical control device also includes a set of the first line-defect waveguide 5, third line-defect waveguide 8 and the second line-defect waveguide 11, connected together in this order so that the thicknesses of the dielectric pillars will vary continuously (consecutively) in this order.

Both the first line-defect waveguide 5 and the second line-defect waveguide 11 may be implemented to provide for a low group velocity and group velocity dispersions of opposite polarities with respect to the same wavelength. With the pillar-type square-lattice photonic crystal, shown in FIG. 2, the dielectric pillars of the second line-defect waveguide 11 are thinner than those of the first line-defect waveguide 5. In such case, the wavelength range of the wave guiding mode of the second line-defect waveguide 11 is shifted to the side of a shorter wavelength than that of the wave guide mode of the first line-defect waveguide 5. Further, in a line-defect waveguide in which dielectric columns contained in the line defect are thinner than the surrounding dielectric columns, the group velocity dispersion exhibits ordinary dispersion (with a negative value) on the short wavelength side of the wave guiding mode, while exhibiting extraordinary dispersion (with a positive value) on its long wavelength side. Thus, in a wavelength range in which the wavelength range of the guided mode of the first line-defect waveguide 5 overlaps with that of the second line-defect waveguide 11, it is possible for the first line-defect waveguide and the second line-defect waveguide to exhibit ordinary dispersion and extraordinary dispersion, respectively. Since positive and negative values of the group velocity dispersion of the first line-defect waveguide 5 and the second line-defect waveguide 11 cancel each other, it is possible with the optical delay element of FIG. 2 to eliminate (cancel out) the group velocity dispersion.

The values of the group velocity dispersion are proportional to the length along the waveguide direction of the waveguide. Thus, by proper selection of the lengths of the first line-defect waveguide 5 and the second line-defect waveguide 11, it is also possible to manufacture an optical delay element giving a group velocity dispersion either of a positive or negative value as an optical delay element of FIG. 2 on the whole.

The light guided in the first line-defect waveguide 5 and that guided in the second line-defect waveguide 11 are guided under confinement in the vicinity of the line defects. It is observed that the manner of spread (distribution) of the electromagnetic field of light as well as the intensity ratios of the electrical field and the magnetic field of light in the two waveguides differ from each other. Hence, the third line-defect waveguide 8 is interposed between the first line-defect waveguide 5 and the second line-defect waveguide 11 to structurally-gently (adiabatically) couple together or interconnect the two waveguides. This should reduce reflection and/or loss of the guided light that might otherwise be produced between the first line-defect waveguide 5 and the second line-defect waveguide 11.

Preferably, the length of third line-defect waveguide 8 in the wave guiding direction is not less than five times a lattice period (pitch). This should sufficiently decrease the reflection and loss otherwise caused by the third line-defect waveguide 8.

The method for manufacturing the optical control device of Example 1 is now described.

For manufacture, a silicon-on-insulator (Si on Insulator wafer, SOI) substrate may be used. The SOI substrate can be fabricated by forming a thin film of silicon dioxide, termed a buried oxide film, on a silicon substrate, and by forming thereon a thin silicon film termed a silicon active layer.

A photoresist is coated on the silicon active layer that forms an uppermost layer. A pattern of an optical control device of a photonic crystal of FIG. 2 is formed thereon by a photolithographic technique. The silicon active layer is etched vertically into pillars, using a fluorine-based silicon dry etching apparatus. After removing the photoresist, silicon pillars are buried by silicon dioxide or an optical resin that has the same refractive index as that of silicon dioxide. This completes the optical control device shown in FIG. 2.

EXAMPLE 2

An Example 2 is now described.

In Example 1 (FIG. 2), the cross-sectional shape of a dielectric pillar is circular, as an example. However, to achieve at the effect of the present invention, the cross-sectional shape need not necessarily be circular. In addition, the pillar shapes may be varied in a direction from the first line-defect waveguide to the second line-defect waveguide, instead of varying the pillar thicknesses, whereby it is possible to reverse the effect of the group velocity dispersion with a low group velocity being kept.

That is, referring to FIG. 5, the optical control device of the present Example is an optical control device (optical delay element) comprised of a pillar-type square-lattice photonic crystal including a line-defect waveguide. The photonic crystal includes a first line-defect waveguide 32, a second line-defect waveguide 38 and a third line-defect waveguide 35.

The cross-sectional shape of the dielectric pillars of the first line-defect waveguide is circular, while that of the dielectric pillars of the second line-defect waveguide is square. The cross-sectional shapes of the dielectric pillars of the third line-defect waveguide are gradually varied from the circle to the square in a direction of the wave guiding path. Preferably, the optical control device is formed by interconnecting the first line-defect waveguide 32, third line-defect waveguide 35 and the second line-defect waveguide 38 so that the cross-sectional shapes of the pillars are varied continuously (consecutively) in this order.

From the perspective of ease in manufacture, the cross-sectional shape is preferably varied between a square and a circle, as an example.

The length of the third line-defect waveguide 35 along the wave guiding direction is preferably not less than five times a lattice period (pitch). It is then possible to reduce reflections and/or loss on an interface between the first and third line-defect waveguides (32, 35), on an interface between the second and third line-defect waveguides (35, 38) or in the third line-defect waveguide 35.

The method for manufacturing of Example 2 is basically the same as that of Example 1.

An electron beam photoresist is coated on a SOI substrate, which has a 1-μm-thick silicon active layer, by using a spin coater, and a pattern of FIG. 5 is written by using an electron-beam exposure device (direct writer). The lattice period is 0.4 μm, for example. The diameter of a column not contained in a line defect in the first line-defect waveguide 32 is 0.24 μm, while that of pillars contained in the line defect is 0.16 μm, for example. A square pillar, not contained in a line defect in the second line-defect waveguide 38, has a 0.24-μm-long side, while square pillars, contained in the line defect, have a 0.1-μm-long side. A silicon active layer is vertically etched by using a dry etching apparatus with a gas mixture of sulfur hexafluoride and quadro carbon octafluoride. After removing the photoresist with organic solvant, silicon dioxide is deposited using a thermal CVD apparatus. Based on the above-described manufacturing method, the optical control device, shown in FIG. 5, may be fabricated.

Industrial Applicability

A small-sized optical delay element (optical control device or element), suited for high speed signal processing, according to the present invention, may be integrated as one element in an optical integrated circuit. Hence, the present invention contributes to improving the integration degree and to realization of a broader range of application of the optical integrated circuit.

The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims.

The invention claimed is:

1. An optical control device including a plurality of line-defect waveguides provided in a photonic crystal; each line-defect waveguide including a multiplicity of dielectric pillars with a finite height arranged at lattice points of a two-dimensional Bravais lattice; said optical control device comprising:
   a first line-defect waveguide;
   a second line-defect waveguide provided with the dielectric pillars that have lattice point intervals (that is, local lattice constants) different from those of the dielectric pillars of said first line-defect waveguide; and
   a third line-defect waveguide arranged between said first and second line-defect waveguides and provided with dielectric pillars whose lattice point intervals are gradually varied from the those of the dielectric pillars of said first line-defect waveguide to the those of the dielectric pillars of said second line-defect waveguide in the course from said first line-defect waveguide towards said second line-defect waveguide, along the wave guiding direction.

2. The optical control device according to claim 1 wherein a further line-defect waveguide, whose lattice point intervals have cross-sectional shapes gradually varied along the wave guiding direction, is provided at one end or at each of both ends along the wave guiding direction of said optical control device including said first to third line-defect waveguides.

3. The optical control device according to claim 1, wherein said third line-defect waveguide has a length along the wave guiding direction not less than five times a lattice period.

4. The optical control device according to claim 1, wherein the lattice point intervals of the dielectric pillars contained in the line defect of said first and second line-defect waveguides differ only with respect to those of the dielectric pillars contained in the line defect of said first and second line-defect waveguides, and wherein the lattice point intervals of dielectric pillars not contained in the line defect of said first and second line-defect waveguides are equal.

5. The optical control device according to claim 1, wherein only lattice point intervals of the dielectric pillars not contained in the line defect of said first and second line-defect waveguides differ, and wherein the lattice point intervals of the dielectric pillars contained in the line defect(s) of said first and second line-defect waveguides are equal.

6. The optical control device according to claim 1, wherein, in said first and second line-defect waveguides, the lattice point intervals of the dielectric pillars contained in the line defects are equal to the lattice point intervals of the dielectric pillars not contained in the line defects.

* * * * *